(12) United States Patent
Henningfield et al.

(10) Patent No.: US 6,790,288 B2
(45) Date of Patent: Sep. 14, 2004

(54) PROCESS AND PLANT FOR EVAPORATIVE CONCENTRATION AND CRYSTALLIZATION OF A VISCOUS LACTOSE-CONTAINING AQUEOUS LIQUID

(75) Inventors: Thomas David Henningfield, River Falls, WI (US); Richard Andrew Dinesen, Woodbury, MN (US)

(73) Assignee: Niro A/S, Soborg (DK)

( * ) Notice: Subject to any disclaimer, the term of this patent is extended or adjusted under 35 U.S.C. 154(b) by 164 days.

(21) Appl. No.: 10/124,272

(22) Filed: Apr. 18, 2002

(65) Prior Publication Data

US 2003/0196957 A1 Oct. 23, 2003

(30) Foreign Application Priority Data

Apr. 17, 2002 (DK) .......................................... 2002 00567

(51) Int. Cl.[7] .................................................. C13F 1/02
(52) U.S. Cl. .......................................... 127/61; 127/16
(58) Field of Search ...................................... 127/16, 61

(56) References Cited

U.S. PATENT DOCUMENTS

| | | | |
|---|---|---|---|
| 3,425,135 A | 2/1969 | Langsetmo et al. | |
| 3,639,170 A | * 2/1972 | Hutton et al. | 127/31 |
| 4,351,849 A | 9/1982 | Meade | |
| 4,955,363 A | * 9/1990 | Harju et al. | 127/46.1 |
| 5,006,204 A | 4/1991 | Jensen | |
| 5,271,163 A | 12/1993 | Pikus et al. | |
| 5,980,640 A | * 11/1999 | Nurmi et al. | 127/60 |
| 6,335,045 B1 | 1/2002 | Peters et al. | |

OTHER PUBLICATIONS

Nature A Weekly Journal of Science, vol. 195, (Jul. 7, 1962,) Mullin, et al.

* cited by examiner

*Primary Examiner*—David Brunsman
(74) *Attorney, Agent, or Firm*—Sughrue Mion, PLLC

(57) ABSTRACT

Crystalline α-lactose monohydrate is recovered from a viscous lactose-containing aqueous liquid by subjecting said liquid to simultaneous heating, removal of evaporated vapor and mechanical agitation at high shear rate to provide a crystallization promoting decrease of the viscosity of the liquid with crystals formed and suspended therein to progressively concentrate the agitated liquid and simultaneously crystallize lactose therefrom. Subsequent cooling, drying, and disintegration yield particulate α-lactose monohydrate.

9 Claims, 1 Drawing Sheet

PROCESS AND PLANT FOR EVAPORATIVE CONCENTRATION AND CRYSTALLIZATION OF A VISCOUS LACTOSE-CONTAINING AQUEOUS LIQUID

FIELD OF THE INVENTION

The present invention relates to the recovery of lactose from liquids formed as by-products in the dairy industry and related industries.

More specificly, the invention relates to a process and a plant for converting lactose-containing liquids into easy to handle particulate products having non-caking and free-flowing characteristics.

In the present specification and the attached claims the term "lactose-containing liquids" is used as comprising solutions, wherein all lactose is in a dissolved state, as well as slurries of lactose crystals in lactose solutions.

BACKGROUND OF THE INVENTION AND PRIOR ART

Lactose is a disaccharide, which in solid state exists in at least three forms, viz. α-lactose, crystallizing as the monohydrate from aqueous solutions at temperatures below 93.5° C., β-lactose, and amorphous lactose.

Of these three forms, the α-lactose monohydrate is preferred since it when relatively pure forms stable, hard, and non-hygroscopic crystals.

In contrast thereto, especially the amorphous form of lactose is hygroscopic, and the presence of even minor amounts of the amorphous form on crystals of α-lactose monohydrate may impair the non-caking and free-flowing characteristics of the latter.

Lactose is present in a concentration of approximately 5% in cow milk, which is the dominating source therefore.

Nearly all cheese-making processes have a by-product, whey, which is an aqueous solution, which, besides nearly all the lactose originally present in the milk, contains some fat, protein, and inorganic salts. The term "whey" is here applied in a broad sense, comprising cheese whey, rennet casein whey, acid whey, and salty whey.

With the primary purpose of recovering protein values from the whey or from milk, this is often subjected to an ultra-filtration, whereby the proteins are obtained as retentate, whereas the lactose and most of the minerals remain dissolved in the water passing through the filter membrane. This aqueous solution of lactose with highly reduced protein consent is simply termed "permeate". This is the lactose source preferred in connection with the present invention although other whey-related products come into consideration.

Before used as starting material in the exploitation of the present invention, such permeate or related whey products may be subjected to a purification, e.g. a demineralization, and it is, preferably by means of vacuum evaporation, concentrated to a dry solids content of 40–75% by weight.

The main applications for lactose are as sweetener for ice cream mixes, for baking applications, and as component of animal feed but substantial amounts are also used as nutrient in culture media for micro-organisms in the bio-technical industries. For the baking industry it is, inter alia used with the purpose of obtaining a desired brown colour of the bread crust.

Although these various fields of application have different requirements as to purity and visual appearance of the lactose, it is for all applications desired to use the lactose as a particulate non-sticking, non-hygroscopic, and non-caking free-flowing product.

Several processes have been suggested and used for converting lactose in whey or whey-derive products into a particulate material.

However, a relatively fast drying process as obtained by spray drying results in particles, in which only a part of the lactose is present as α-lactose monohydrate, whereas the remaining part thereof is present in a form which makes the particles sticky and hygroscopic.

Thus, a certain rest time is necessary before the cooled product resulting from the drying process can form free-flowing particles.

However, even after such treatment the resulting particles show tendency of hygroscopicity and caking.

This principle of fast drying combined with a subsequent rest is utilized in the FILTERMAT® process (Niro A/S) disclosed in U.S. Pat. No. 4,351,849 and also in the process disclosed in U.S. Pat. No. 5,006,204 (Assignee: A/S Niro Atomizer). In this last-mentioned process, a pre-crystallization is used before the spray drying, and the spray dried material rests on a rotating disc before after-drying in a fluidized bed.

A different concept is used in U.S. Pat. No. 6,335,045, according to which the lactose-containing concentrate is heated to a temperature above the crystallization temperature and thereafter subjected to a flash process resulting in a concentrate of higher dry solids content than the starting concentrate, which concentrate is subsequently cooled to induce crystallization. Afterwards, the crystallized concentrate can be dried in a spin-flash dryer. However, even with this rather complicated process, the results are not always satisfactory in terms of caking properties.

In the considerations preceding the present invention, we assumed that if a higher percentage of the lactose in the particulate product were present as the α-lactose monohydrate form, the properties in the above-mentioned respects would be improved, and this turned out to be correct.

Highly concentrated aqueous lactose solutions have high viscosity, and we assumed that this could be an important reason why the crystallization of α-lactose monohydrate in the prior art processes has been incomplete.

The invention is based on the recognition that it is possible by intensive agitation of the concentrate while it is being further concentrated by evaporation, due to the pseudo-plastic and thixotropic properties of the concentrate, to reduce the viscosity thereof to an extent, which highly promotes crystallization. The beneficial effect of this decrease of viscosity on crystallization more than compensates for any negative effect on the crystallization process caused by the intensive agitation. Thereby it is achieved that formation and growth of crystals occur simultaneously with the evaporation of the concentrate. Thereby, the viscosity is lowered, not only due to the pseudo-plastic and thixotropic characteristics of the concentrate mentioned but also because an excessive viscosity increasing super-saturation would be prevented.

It should be observed that generally the effect of mechanical agitation on the crystallization process is somewhat unpredictable. Reference is made to Mullin and Raven: "Influence of mechanical agitation on the nucleation of some aqueous salt solutions", Nature, Vol. 195, page 35–38 (1962). According to said paper, nucleation, which is a prerequisite for crystallization, is generally higher in a moderately agitated liquid than under quiescent conditions but with increasing intensity of agitation, nucleation decreased and at still further intensities increased again and finally some decrease was observed. In said paper it is proposed that this unpredictable effect is a combined result of the influence of the agitation on the diffusion and the attrition.

In most commercial crystallization processes where relatively large crystals are desired, such as in the sugar industry, crystallization is performed at rather gentle agitation of the crystallizing medium, e.g. by using so-called crystallization cradles. An intensive agitation is regarded as harmful, not only due to attrition but also because it may result in the formation of too many crystallization embryos causing too small and uneven crystals.

However, as mentioned above, it has turned out that due to the pseudo-plastic and thixotropic properties of the lactose concentrates under evaporation an improved crystallization result is obtained by using a mechanical agitation of high shear rate.

SUMMARY OF THE INVENTION

The present invention thus relates to a method for evaporative concentration and crystallization of a viscous lactose-containing aqueous liquid, comprising:

(a) introducing the lactose-containing aqueous liquid having a dry solids content of 40–75% by weight into a zone and therein subjecting it to the following simultaneous measures:
   i) progressive heating at a temperature above 40° C. but below the maximum temperature for crystallization of α-lactose monohydrate from the liquid;
   (ii) removal of vapour evaporated from the liquid; and
   (iii) mechanical agitation able to provide a crystallization promoting decrease of the viscosity of the liquid with crystals formed and suspended therein;
to progressively concentrate and simultaneously crystallize the agitated liquid, and
(b) recovering the resulting slurry from said zone at a total solids content above 75% for cooling and optional disintegration and further drying.

By this process, optimal conditions for crystallization of α-lactose monohydrate are achieved.

The mechanical agitation drastically decreases the viscosity of the liquid being evaporated, whereby lactose molecules in the only slightly super-saturated liquid easily diffuse to the surface of crystals and nuclei therefore to promote crystal growth meaning that the content of dissolved lactose and thus the degree of super-saturation of the liquid decreases.

Also the simultaneous progressive evaporation and crystallization ensures the existence of optimal conditions for crystallization over a prolonged period and over a broad range of temperature levels of the liquid.

The above measure "removal of vapour evaporated from the liquid" should be construed in a broad sense as covering not only active steps, such as application of reduced or increased pressure, but also the mere ensuring that such vapour can be vented.

The process is preferably performed as a continuous operation, wherein said lactose-containing aqueous liquid is introduced into one end of an elongated essentially horizontal zone;
the heating in measure (i) is carried out by supplying a heating medium to a jacket surrounding at least a portion of said zone;
said vapour evaporated from the liquid is in measure (ii) removed by purging said zone by passing an air flow therethrough;
the agitation in measure (iii) is performed by rotating an essentially horizontal shaft carrying agitation means to agitate the total volume of liquid present in said zone; and
said slurry is recovered from the end of the elongated zone opposite to said one end.

In a typical embodiment of the process, the lactose-containing aqueous liquid used as starting material is selected from the group consisting of concentrates of permeate formed by ultrafiltration of sweet or acid whey or milk, concentrates of whey or of demineralized whey, mother-liquor from lactose recovery, and lactose slush.

In the above-described continuous operation, the heating is preferably performed by supplying steam to the jacket mentioned. If the liquid to be treated is permeate concentrate coming directly from a conventional evaporator its content of dry solids can typically be 55–60% and its temperature typically 65° C.

By passage through said zone, the amount of total dry solids increases to e.g. 87% and the amount of crystallized α-lactose monohydrate to 85% of the lactose.

Due to the previous intensive agitation of this pseudo-plastic and thixotropic mass, by the recovering from said zone it forms a gruel, which is still transportable, e.g. pumpable.

The above-mentioned cooling and optional disintegration and further drying can for instance be accomplished by passing said gruel through an auger apparatus having cooling surfaces, and subsequently through a disintegrating and drying device.

However, the cooling may be a natural cooling or a forced cooling.

The invention further comprises a plant suitable for carrying out the above-described process.

Thus, in this aspect the invention deals with a plant for converting an aqueous lactose-containing liquid into free-flowing particles comprising:

(a) a first device having (i) an elongated cylindrical horizontal housing of essentially circular vertical cross-section, (ii) an inlet for lactose-containing liquid at one end of said housing, (iii) a rotatable horizontal shaft axially in said housing, (iv) paddles radially extending from the shaft towards the cylindrical wall of the housing, (v) a heating jacket surrounding at least partially said housing, (vi) openings at each end of the housing for removing vapours and, (vii) an outlet in the housing for lactose-containing gruel near the end opposite to said one end,
(b) a cooling device connected to said outlet end designed as an auger having at least one screw end being provided with a jacket and/or hollow screw shaft(s) for receiving a cooling medium, and
(c) a disintegrating and drying device connected to said cooling device.

The device defined under (a) can be rather similar to an apparatus disclosed in U.S. Pat. No. 3,425,135. In said disclosure, the apparatus is described as an apparatus for processing solids and all the examples illustrate drying of such.

The residence time in this apparatus can be adjusted by setting the padres in a backward pitch. Thereby sufficient time for an almost complete crystallization can be obtained when performing the process of the present invention. An apparatus of similar construction is disclosed in U.S. Pat. No. 5,271,163, wherein it is described as suitable for flowable materials. However, this last-mentioned apparatus is specific by having means for introduced gas through nozzles in the rotating parts with a view of spreading the material to be treated over the walls of the housing. No applications akin to lactose crystallization seem to be mentioned in said US patent.

The process and the plant according to the invention are further elucidated below by reference to the drawing.

DETAILED DESCRIPTION OF EMBODIMENTS OF THE INVENTION

Figure 1:
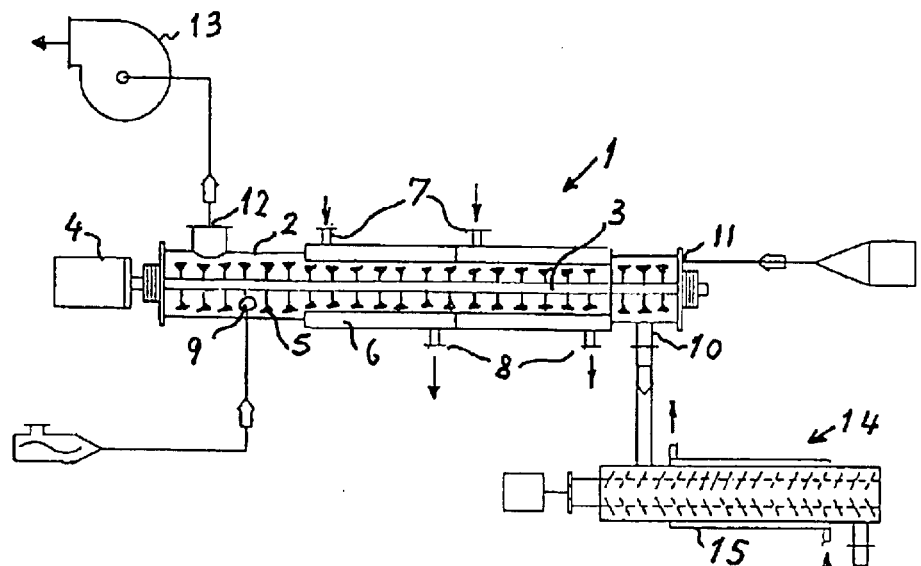
FIG. 1 schematically depicts an embodiment of a plant according to the invention suitable for performing the process of the invention.

In FIG. 1 a device wherein the starting liquid is heated and agitated and evaporated and crystallized is generally indicated 1.

This device comprises a cylindrical elongated housing 2 and therein a shaft 3 rotatable by means of a motor 4. On said shaft paddles 5 extend outwardly to a point adjacent to the wall of the housing but the paddles do not contact said housing.

In the embodiment shown, the shaft 3 is axially centred to have all paddles at the same distance from the wall of the housing 2.

The housing is at least partially surrounded by a heating jacket 6, which in the shown embodiment is divided into two sections.

To said jacket, a heating medium, such as hot water or steam, e.g. at a temperature of 50–150° C. is introduced through inlets 7 and condensed water and any surplus of steam is withdrawn from outlets 8.

In contrast to what is shown in the drawing, the inner wall of the jacket will preferably be in line with the cylindrical wall of the housing 2.

The housing has an inlet opening 9 for the concentrate used as starting material and an outlet 10 for the α-lactose monohydrate crystals containing gruel resulting from the treatment in the device 1.

The device further has an entrance 11 and an exit 12 connected to a fan 13 to provide a draft whereby filtered atmospheric air enters the interior of the housing through 11, passes through and purges the housing and is exhausted through 12 and 13.

Thus, in the embodiment depicted the water vapour formed by the evaporation in the housing is removed by purging with air at ambient temperature. However, it would be possible to supplement or substitute the heating by means of the jacket 6 by drawing a stream of moderately heated air through the housing.

When operating said device and performing the process of the invention, the starting material liquid is introduced through inlet 9 and the shaft 3 with paddles 5 is rotated by means of the motor 4.

Within the housing 2, the liquid is subjected to a high shear agitation by the paddles and is thrown outwards due to the centrifugal force and thus forms an agitated ring along the inner surface of the housing and the heating jacket 7. Thereby an efficient heat transfer is obtained causing a rise of temperature and resulting evaporation of the liquid. Also the shaft 3 may be heated.

The paddles are spaced on the rotor so that all places of the heated inner wall of the housing are affected periodically when the paddles are rotating.

Figure 2:
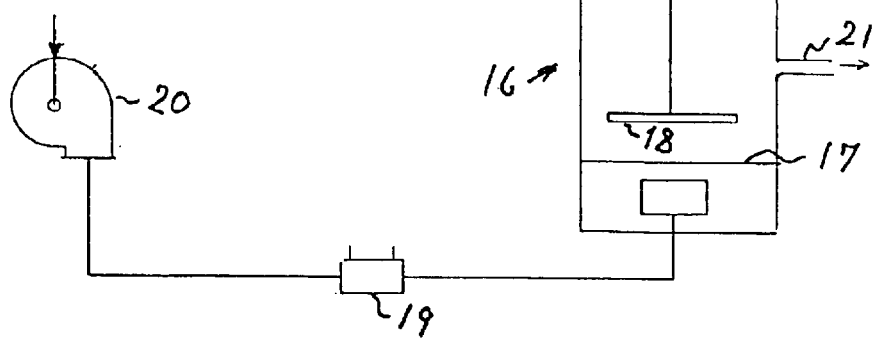
FIG. 2 schematically shows an alternative suitable embodiment of a detail of the plant of FIG. 1.
Figure 2:
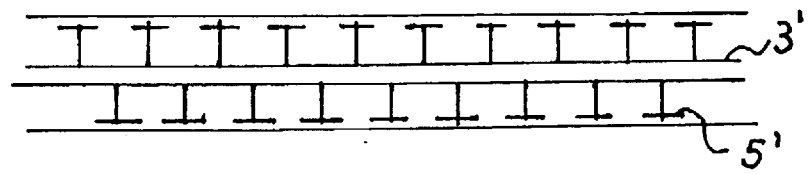

In the embodiment of FIG. 2, paddles 5' on shaft 3' are arranged in mutually displaced rows to ensure a uniform affection of all areas of the heated inner wall of the housing.

The shear rate at the most affected locations is given by the paddle peripheral speed, which is typically 5–15 m/s, divided by the distance from the paddle tip to the inner wall of the housing, typically being 5–25 mm. The shear rate provided by the paddles is typically 200–3500 $s^{-1}$, preferably 300–3000 $s^{-1}$, and more preferably 400–2500 $s^{-1}$.

The position of the paddles 5, the rate of introducing starting material through 9 and possibly a derivation of the position of the housing away from the horizontal can be used to obtain a desired residence time within the housing.

Guiding experiments indicate that residence times of 2–15 mm will be sufficient.

When reaching the outlet 10 as a hot gruel, the crystallization is substantially completed and the portion of α-lactose monohydrate crystals may typically be 80–90% of the lactose and the free moisture content 8–18%.

At that stage, the gruel is transportable/pumpable but if a sample thereof is allowed to cool without agitation, the effects due to pseudo-plasticity and thixotropicity disappear and the sample becomes hard.

Therefore, the gruel recovered through 10 is directed to a devices which in the depicted embodiment is a double-screw anger 14 having a cooling jacket 15. Preferably, said device also has hollow screw shafts (not shown) for introducing cooling medium.

In the auger 14, the material being treated cools down to a temperature of e.g. 20–40° C. and mainly due to thermoplastic reasons the viscosity increases substantially and a thick non-pumpable mass is formed.

However, the cooling device may be built together with the device 1 as a section having a cooling jacket instead of a heating jacket and, possibly, separate agitation means.

In the shown embodiment, this mass is transferred to a disintegrating and drying device, which may be a fluidized bed apparatus 16 having a gas distribution plate 17 and a stirring means 18 for disintegration of the mass received from 14. Drying air is introduced by fan 20 through a heater 19 and fluidizes and dries the material in a bed formed above the plate 17. An outlet 21 acts as a weir and the product is recovered through said outlet.

Optionally, crystallized final or intermediate products may be recycled to the inlet 9 of the device 1, or to the inlet of the cooling device whether this is a section of device 1 having a cooling jacket, or is a separate cooling device.

Materials prepared as described above have been subjected to various tests showing their superiority over conventional products, especially their non-caking and free-flowing properties.

To further elucidate an embodiment of the invention, the following non-limiting example is presented.

EXAMPLE

The pilot plant used in this example comprised a small version of a device marketed under the name ROSINAIRE™. This is an apparatus originally designed for drying fibres and other solids. In principle, it is constructed as the device 1 in the drawing.

The horizontal housing of the device had an inside diameter of 254 mm, and the distance from the paddle tips to the interior wall of the housing was approximately 6 mm.

The shaft with paddles was rotated at a velocity corresponding to a peripheral speed of the paddles of approximately 9 m/s, corresponding to a shear rate of 1,500 s$^{-1}$.

In commercial applications, it is foreseen to use substantially larger devices having inside diameters of 1–2 m and shear rates of 300–800 s$^{-1}$.

The starting material was a demineralized permeate concentrate having a free-moisture content of 45% and a temperature of 65° C.

This starting material was supplied through the inlet 9 at a rate of 130 kg/h. Steam was introduced through 7 at a temperature of 109° C. and ambient air was drawn in through 11 at a temperature of approximately 30° C.

This air was removed together with water vapour evaporated from the permeate concentrate through exit 12 at a temperature of 64° C.

The position of the paddles and the amount of starting material introduced into the device was adjusted to obtain a residence time therein of approximately 4 min.

During the passage through the device, permeate concentrate was subjected to a heating and simultaneously to a high shear rate (1,500 s$^{-1}$ as explained above), and the air flow maintained through the device provided an efficient means for removing water vapour from the extensively agitated liquid, thereby obtaining an efficient evaporation at temperatures substantially below the boiling temperature of said concentrate.

This evaporation caused an increase of the lactose concentration resulting in crystal formation and growth. This formation and growth of crystals were promoted by the viscosity decrease of the slurry, for which reason only a moderate super-saturation was experienced. This is in contrast to other processes involving evaporation of aqueous lactose solutions, in which no specific measures are taken to utilize pseudo-plastical and thixotropical capabilities to decrease viscosity by applying a high shear rate.

When reaching the outlet 10, the amount of free-moisture in the crystal slurry had been reduced to 13% and the temperature thereof was 64° C. 85% of the lactose was at that stage present as crystalline α-lactose monohydrate. The amount of gruel withdrawn per hour through 10 was 83 kg/h having 87% solids.

This material was transferred to the cooling device 14.

To imitate cooling by means of a jacket 15, cooling was obtained by introducing liquid nitrogen into the device 14 together with the material from 10. Thereby the latter was cooled to a temperature of 30° C., and it was transferred to a stirred fluidized bed apparatus for drying to reduce the free-moisture to 2%.

An amount of 75 kg/h of this final product was recovered as a free-flowing, non-hygroscopic particulate material.

What is claimed is:

1. A process for evaporative concentration and crystallization of a viscous lactose-containing aqueous liquid, comprising:
   (a) introducing the lactose-containing aqueous liquid having a dry solids content of 40–75% by weight into a zone and therein subjecting it to the following simultaneous measures;
      (i) progressive heating at a temperature above 40° C. but below the maximum temperature for crystallization of α-lactose monohydrate from the liquid;
      (ii) removal of vapour evaporated from the liquid; and
      (iii) mechanical agitation able to provide a crystallization promoting decrease of the viscosity of the liquid with crystals formed and suspended therein;
   to progressively concentrate and simultaneously crystallize the agitated liquid, and
   (b) recovering the resulting slurry from said zone at a total solids content above 75% for cooling and optional disintegration and further drying.

2. The process of claim 1 performed as a continuous operation, wherein
   said lactose-containing aqueous liquid is introduced into one end of an elongated essentially horizontal zone;
   the heating in measure (i) is carried out by supplying a heating medium to a jacket surrounding at least a portion of said zone;
   said vapour evaporated from the liquid is in measure (ii) removed by purging said zone by passing an air flow therethrough;
   the agitation in measure (iii) is performed by rotating an essentially horizontal shaft carrying agitation means to agitate the total volume of liquid present in said zone; and
   recovering said slurry from the end of the elongated zone opposite to said one end.

3. The process of anyone of claim 1 or 2, wherein said lactose-containing aqueous liquid used as starting material is selected from the group consisting of concentrates of permeate formed by ultra filtration of sweet or acid whey or milk, concentrates of whey or of demineralized whey, and mother-liquor from lactose recovery, and lactose slush.

4. The process of anyone of claim 1 or 2, wherein the heating in measure (i) is caused to increase the temperature of the liquid to 50–90° C.

5. The process of anyone of claim 1 or 2, wherein the agitation of measure (iii) is performed at an intensity to provide a shear rate of 200–3,500 s$^{-1}$ in the liquid.

6. The process of anyone of claim 1 or 2, wherein the agitation of measure (iii) is performed at an intensity to provide a shear rate of 300–3,000 s$^{-1}$ in the liquid.

7. The process of anyone of claim 1 or 2, wherein the agitation of measure (iii) is performed at an intensity to provide a shear rate of 400–2,500 s$^{-1}$ in the liquid.

8. The process of claim 1 or 2, wherein said cooling and optional disintegration and further drying comprise passing said slurry through an auger apparatus having cooling surfaces and subsequently through a disintegrating and drying device.

9. The process of claim 1, wherein the removal of vapour in step (ii) is accomplished by maintaining a reduced pressure in said zone.

* * * * *